Aug. 25, 1959   V. B. WALLACE   2,900,728
DRAFTING MACHINE INDEXING MEANS
Filed March 11, 1957   3 Sheets-Sheet 2
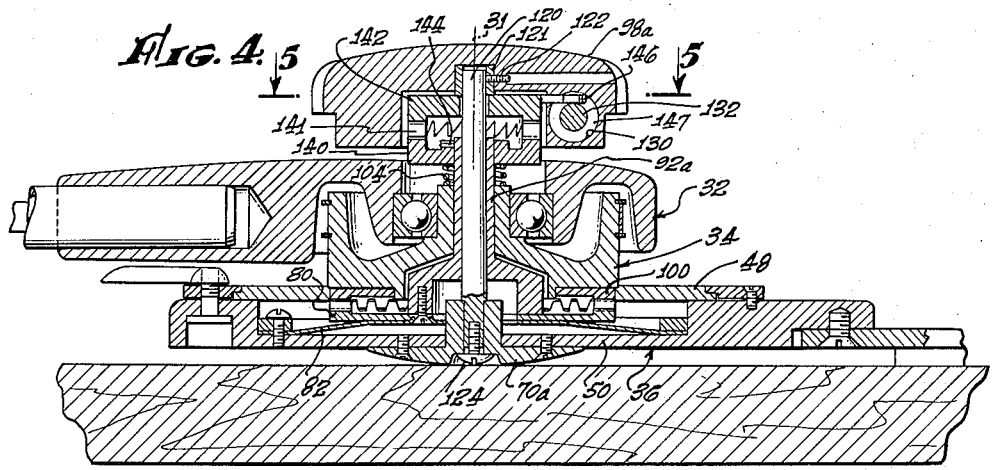
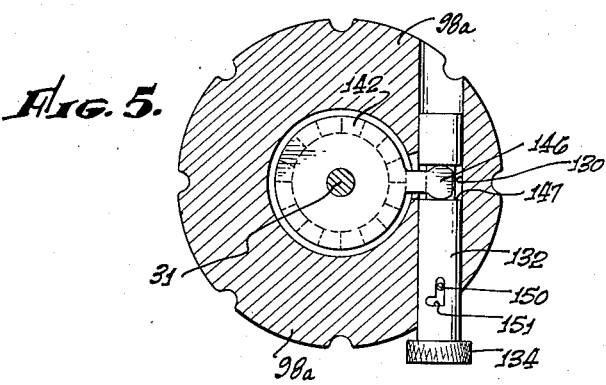
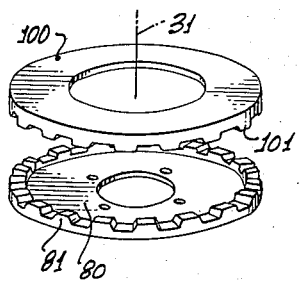
VARD B. WALLACE,
INVENTOR.
BY
Barkelew & Lewis Aug. 25, 1959

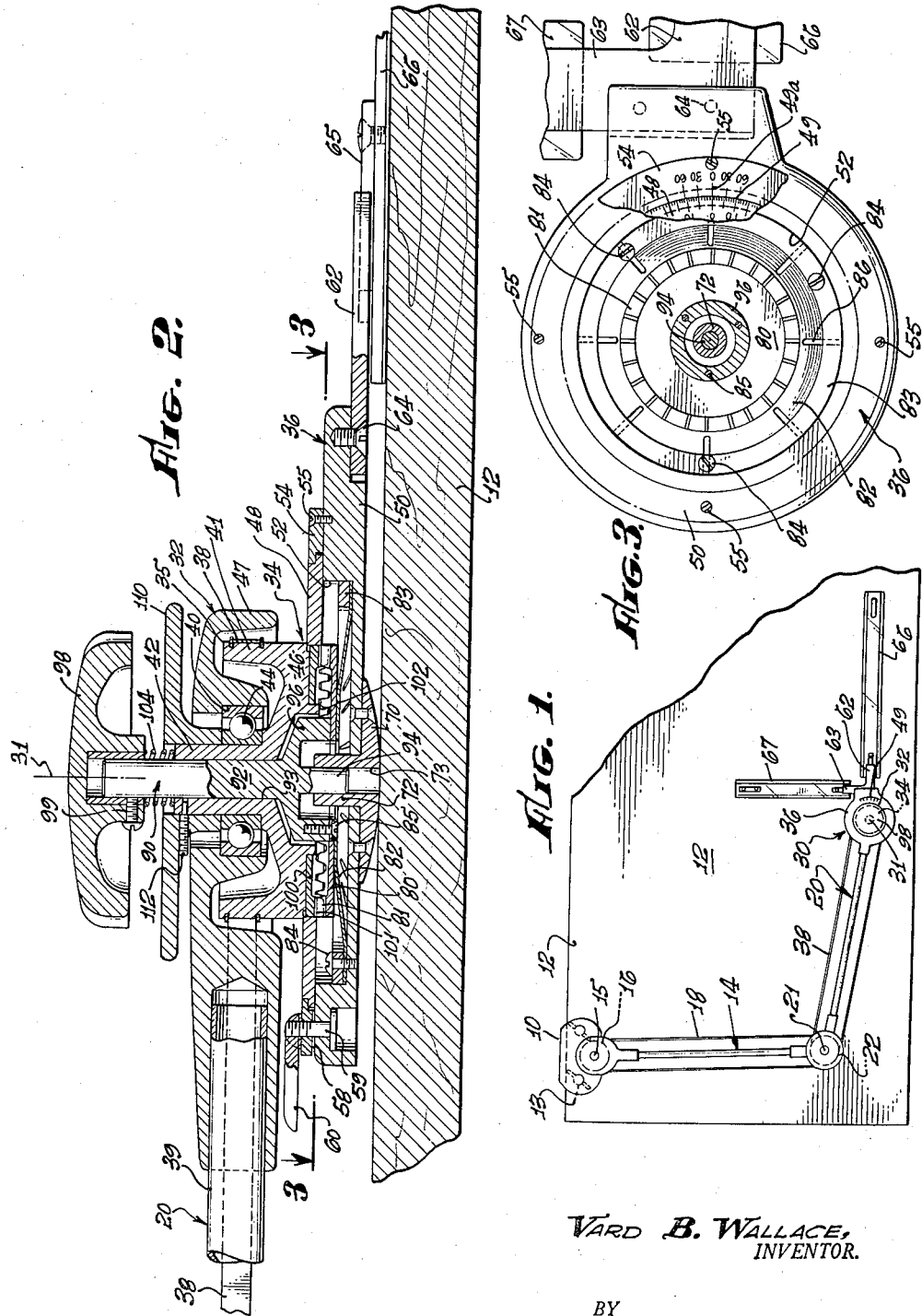

V. B. WALLACE 2,900,728

DRAFTING MACHINE INDEXING MEANS

Filed March 11, 1957

VARD B. WALLACE,
INVENTOR.

BY
Barkelew & Lewis

United States Patent Office 2,900,728
Patented Aug. 25, 1959

2,900,728

DRAFTING MACHINE INDEXING MEANS

Vard B. Wallace, Monrovia, Calif., assignor to Vard Products Inc., Pasadena, Calif., a corporation of California Application March 11, 1957, Serial No. 645,267

11 Claims. (Cl. 33—79)

This invention has to do with drafting machines and the like in which a scale, straight edge, or other drafting instrument is rotationally adjustable with respect to a reference member. The invention provides improved indexing means for releasably locking the drafting instrument at any one of a plurality of uniformly spaced rotational positions with respect to the reference member.

The invention pertains more particularly to drafting machine of known type in which the reference member comprises part of a head assembly which is shiftable in translation over the surface of a drawing board, the reference member being restrained from rotation by a mechanical linkage mechanism which teminates in an anchor member fixedly mounted on the board. Such machines typically comprise an inner arm pivoted at one end on the anchor member, an outer arm pivotally mounted at the free end of the inner arm, and a head assembly carried at the free end of the outer arm. The head assembly includes a reference member journaled on a head axis which is parallel to the two arm pivot axes and perpendicular to the board surface. The reference member is rotationally fixed with respect to the anchor member by any suitable means, typically comprising a system of pulleys and flexible bands. The head assembly also includes an instrument carrying member which is journaled coaxially with the reference member and is releasably engageable with the reference member to be rotationally driven thereby.

In a drafting machine of that illustrative type, it is customary to provide as part of the head structure of the machine two types of releasable driving connection between the reference member and the instrument carrier. One such type of connection permits the instrument carrier to be frictionally clamped to the reference member at any arbitrarily selected mutual angle. The second type of connection, with which the present invention is more particularly concerned, permits the instrument carrier to be positively indexed with respect to the reference member at any selected one of a plurality of discrete and uniformly spaced mutual angles. The interval between adjacent indexing angles may be any integral sub-multiple of 360°. For definiteness and clarity of description, that interval will be illustratively taken as 15°, but without thereby implying any limitation upon the present invention.

To be fully satisfactory, an indexing mechanism for the described purpose must meet very exacting standards. It must be positive in action and allow no rotary play between the instrument carrier and reference member when in locked condition. It must be highly accurate at every one of its index angles. It should be light and compact to facilitate operation of the machine, and should be conveniently shiftable between locked and released conditions.

The present invention provides an indexing mechanism which is exceptionally satisfactory in all of those respects. In particular, it is free of a serious difficulty to which previous machines have been subject. In ordinary drafting practice a drafting machine is used a very large proportion of the time at one or two definite index angles, so that the locking surfaces for those angles tend to become worn. In many previous machines such wear has often produced inaccuracy after a relatively short period of use. That difficulty could be avoided only if the entire indexing mechanism was relatively large and was very carefully constructed of the best obtainable materials. The present invention, on the other hand, provides an indexing mechanism in which the described difficulty is entirely avoided as a result of the inherent design of the machine, and without requiring any heavy or complex and expensive structure.

That is accomplished by providing an indexing mechanism in which each index angle is defined by contact of a very large number of locking surfaces; and in which all locking surfaces are utilized equally at all index angles. Hence wear is not only distributed over many surfaces, reducing any dimensional change that it might produce; but any wear that does occur is distributed uniformly and symmetrically over all locking surfaces, and therefore does not disturb the mutual spacing between index angles.

A further aspect of the present invention concerns improved means for controlling engagement and disengagement of the indexing mechanism. In previous indexing mechanism that control was entirely manual, typically requiring manual operation of a pushbutton or the like against the force of a relatively strong spring. It has now been found possible to provide power means for aiding operation of the indexing mechanism. The operator is thereby relieved of the physical exertion that was previously required. Control of the powered indexing mechanism is exercised via any suitable type of manually operable control device, such, for example, as an electrical switch or a valve mechanism, operation of which requires very slight force. That power control thus aids accurate and convenient manipulation of the drafting machine.

The present type of indexing system has the further advantage of being particularly well adapted for power control of the kind now made available.

A full understanding of the invention, and of its further objects and advantages, will be had from the following description of certain illustrative embodiments, of which description the accompanying drawings form a part. It will be understood that many changes may be made in the particular mechanisms to be described without departing from the proper scope of the invention, which is defined in the appended claims.

In the drawings:

Fig. 1 is a plan, representing in somewhat schematic form an illustrative drafting machine of a type to which the invention pertains;

Fig. 2 is an axial section of an illustrative drafting machine head assembly embodying the invention;

Fig. 3 is a transverse section on line 3—3 of Fig. 2 at reduced scale;

Fig. 4 is an axial section corresponding to Fig. 2 and representing a modification;

Fig. 5 is a section on line 5—5 of Fig. 4;

Fig. 6 is a perspective representing a preferred type of indexing clutch;

Figure 7:
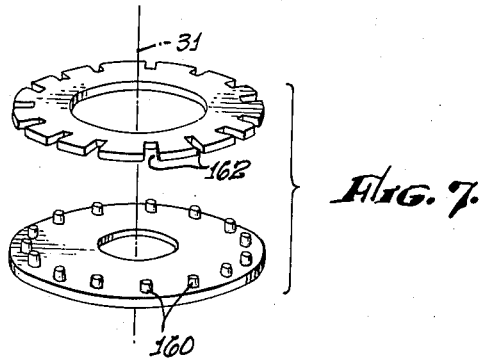
Fig. 7 is a perspective corresponding to Fig. 6 and illustrating a modification.

The illustrative drafting machine represented in Fig. 1 comprises an anchor assembly 10, which is adapted to be mounted fixedly on a drawing board 12 as by the clamp screws 13 beneath the board; an inner arm 14, which is pivotally mounted on anchor assembly 10 on an anchor axis indicated at 15; an outer arm 20, which is pivotally related to inner arm 14 on an elbow axis indicated at 21; and a head assembly 30 carried at the free end of outer arm 20. Head assembly 30 comprises a frame or bracket 32, which forms the outer end of arm 20, a reference member 34, which is journaled with respect to bracket 32 on a head axis 31, and an instrument carrying work member 36, which is also mounted for rotation about head axis 31. As illustrated, work member 36 carries two chuck formations 62 and 63, by which drawing instruments such as the straight edges 66 and 67 may be releasably mounted. The three axes 15, 21 and 31 are mutually parallel and are perpendicular to the surface of drafting board 12. For convenience of description, board 12 will be considered horizontal, so that the three pivot axes of the drafting machine are vertical. However, in actual practice, the drafting board is frequently inclined at an angle to the horizontal.

Head reference member 34 is rotationally linked to anchor 10 by any suitable linkage mechanism that does not prevent swinging movement of arm 14 about anchor axis 15 and swinging movement of arm 20 about elbow axis 21. That linkage system typically and preferably comprises two sets of pulleys and flexible belts. An anchor pulley 16 is mounted on anchor axis 15 in fixed relation to the anchor assembly. A head pulley 35 is coaxial with head axis 31 and preferably forms an integral part of reference member 34. A double pulley 22 is freely rotatable with respect to both arms about elbow axis 21. An inner flexible band 18 is carried by anchor pulley 16 and by one portion of double pulley 22 and prevents relative rotation thereof, regardless of swinging movement of inner arm 14. An outer flexible band 38 is carried by head pulley 35 and the other portion of double pulley 22 and prevents relative rotation thereof, regardless of swinging movement of outer arm 20. Reference member 34 is thereby rotationally tied to anchor assembly 10, and provides a fixed reference direction with respect to which the straight edges 66 and 67, or any other carried tool, may be oriented.

The indexing system of the invention permits the orientation of tool carrier 36 to be controlled in a particularly desirable manner with respect to reference member 34. More particularly, the indexing system permits tool carrier 36 to be rotationally released from reference member 34, so that it may be turned to any desired angle. Clamping means are provided for frictionally clamping the two members at that adjusted angle. The indexing system also permits the tool carrier to be positively locked with respect to the reference member at any selected one of a plurality of predetermined angles, which typically comprise 24 distinct angles 15° apart. Manual control means are provided for shifting the indexing mechanism between released condition and locked condition, and for rotating the tool carrier with respect to reference member 34 when the indexing mechanism is in released condition.

In the specific structure of the illustrative embodiment shown in Figs. 2, 3 and 6, head bracket 32 has a vertical bore 40, which defines head axis 31, and in which the sleeve portion 42 of reference member 34 is journaled by the ball bearing 44. An upstanding peripheral flange 41 is joined to sleeve 42 by the web 46 immediately below bearing 44. Flexible band 38 is carried in a shallow groove in the outer periphery of flange 41, which thus constitutes head pulley 35. Band 38 passes through slots in head bracket 32, which is rigidly mounted on the tubular structural member 39 of outer arm 20. Head bracket 32 is preferably provided with a depending flange portion 47 which overhangs pulley 35 and protects the band. Reference member 34 includes also the fixedly mounted annular scale plate 48, the outer periphery of which provides a bearing support for instrument carrier 36. The upper surface of scale plate 48 may carry a scale from which the angular position of the instrument carrier may be read. Such a scale is indicated at 49 in Fig. 3, with an index mark 49a on carrier 36.

As shown, instrument carrier 36 comprises a generally circular frame plate 50, having a large shallow circular well 52 in its upper face coaxial with head axis 31. The upper surface of plate 50 just outward of well 52 supports scale plate 48 of the reference member. The retaining ring 54 is fixedly secured to frame plate 50, as by the screws 55, and overlaps the outer periphery of the scale plate, axially defining the latter with respect to reference member 34. A portion of retaining ring 54 is made thinner than the rest, as at 58, and is provided with a clamping screw 59 and clamp handle 60. When handle 60 is tightened, the peripheral flange of scale plate 48 is frictionally clamped against the top of carrier plate 50, preventing relative rotation of the instrument carrying member and reference member.

Chuck fixtures 62 and 63 are mounted on plate 50, as by the screws 64, and have grooves formed in their under surfaces adapted to receive suitably formed flanged members 65 which are fixedly mounted on the straight edges 66 and 67 (Figs. 1 and 2). Those straight edges are illustrative of any instrument that it may be desired to mount on carrier 36.

A shoe 70 with curved lower face is preferably mounted beneath frame plate 50 coaxially of axis 31, and forms a foot on which the weight of the entire head assembly may be supported on the surface of board 12. As illustrated, shoe 70 is formed with a central boss 72 which extends upwardly through an axial bore in plate 50 and is in turn bored coaxially at 73 to provide a guideway for the control member to be described.

In accordance with one illustrative embodiment of the present invention, an annular clutch element 80 is mounted in rotationally fixed relation to instrument carrier 36, but in a manner to permit relative axial movement with respect to that member. Clutch element 80 carries circumferentially spaced clutch teeth 81 (see also Fig. 6), to be more fully described. As shown, the mounting means for clutch element 80 comprises a substantially flat annular resilient element 82, which is received in well 52 of plate 50, and the outer periphery of which is fixedly connected thereto in any suitable manner. As shown, a mounting ring 83 is secured to the upper face of element 82 at its outer periphery as by tack welding, and is held in place in well 52 as by the screws 84. The inner periphery of annular spring member 82 is fixedly connected, as by the screws 85, to clutch element 80 near its inner edge. The axial flexibility of resilient element 82 may be increased, if desired, without appreciably reducing its effective rotary rigidity, by providing generally radial or spiral slots, as indicated illustratively at 86 in Fig. 3.

The screws 85 not only connect clutch element 80 to resilient element 82, by which it is rotationally related to instrument carrier 36, but also fixedly connect the clutch element to a control member 90 by which its axial position is controlled. That member, as shown, comprises a spindle portion 92, which is received in an axial bore 93 in reference member 34 for axial and rotational movement. The lower end of spindle 92 carries a guide pin 94, which is slidingly received in the bore 73, already described; and carries also an axially extending flange 96 which spacedly surrounds pin 94. Clutch element 80 is fixed by the screws 85 to the lower end of flange 96. The upper end of spindle 92 carries a control handle, shown as a wheel 98 fixedly mounted on the spindle by the screw 99.

Clutch formations are also provided on reference member 34. As shown, those clutch formations may be formed directly on the reference member, but are more conveniently formed, as illustrated, on an upper clutch element 100 which is fixedly mounted on the lower axial face of the reference member. As illustrated (see also Fig. 6), clutch element 100 is of annular form and is assembled by means of a press fit over a depending flange 102 of reference member 34. The outer periphery of clutch element 100 is dimensioned to provide a press fit within annular scale plate 48, fixedly mounting the latter on the reference member. That structural arrangement is particularly convenient and economical, and provides a rigid and effectively unitary structure. The individual clutch formations on upper clutch element 100 are indicated at 101, and are arranged to engage clutch teeth 81 of lower clutch element 80 when the latter is raised axially into the position shown in Fig. 2, and to be axially spaced from teeth 81 when lower clutch element 80 is lowered axially approximately to the bottom of well 52.

Resilient means of any suitable type are preferably provided for yieldingly urging clutch elements 80 and 100 toward engaged relation. As illustratively shown, a coil spring 104 surrounds spindle 92 between control handle 98 and the upper end of sleeve 42, yieldingly urging the control handle and also lower clutch element 80 axially upwardly to engage clutch teeth 81 and clutch formations 101. Annular spring element 82 may be prestressed in a manner to exert an axially upward yielding force upon clutch element 80, supplementing or replacing spring 104. Downward pressure on handle 98 moves spindle 92 and clutch element 80 axially downward against the described spring force, releasing the clutch teeth. With the clutch elements disengaged, handle 98 may be rotated to positively drive carrier member 36 via spindle 92 and resilient member 82 to any desired angular position with relation to reference member 34, that position being read, if desired, on scale 49. It will be noted that the flat form of resilient member 82 is yielding only with respect to axial movement, and acts as a substantially rigid driving connection for rotary movement.

Axial manipulation of handle 98 may be facilitated, in accordance with a further aspect of the invention, by providing an axially fixed finger piece adjacent the handle. As illustratively shown, such a finger piece is provided as the disk 110, which is fixedly mounted, as by means of the set screw 112, on the upper end of sleeve portion 42 of reference member 34. The hub portion of disk 110 may retain bearing 44 on sleeve 42. The diameter of disk 110 is preferably approximately equal to, or somewhat larger than, that of handle 98, so that the fingers may conveniently grip the peripheries of the disk and hand wheel at the same time, and thereby obtain a fixed standard of reference for controlling the axial movement of handle 98. Whereas finger piece 110 facilitates axial control of handle 98 for many purposes, it is not essential to operation of the mechanism and may be omitted if preferred, bearing 44 being then retained on sleeve 42 by any suitable means of conventional type.

A modified embodiment of the invention is illustratively shown in Figs. 4 and 5. In that embodiment, many of parts may be substantially like those of the previous embodiment and require no further description. Such parts are identified by the same numerals in both embodiments, the letter *a* being added in certain instances when the part is appreciably modified in form.

In the modified embodiment, the handle 98a directly controls only the rotary movement of instrument carrier 36, clutch engagement and disengagement being controlled by means of a separate control element that is movable transversely of head axis 31.

Whereas in the previous embodiment, handle 98 was mounted directly on the upper end of spindle 92, in the modified embodiment, spindle 92a is axially bored to receive the rod 120, and handle 98a is fixedly mounted on the upper end of that rod, as by the embedded bushing 121 and the set screw 122. The lower end of rod 120 is fixedly mounted on frame plate 50 by means of the shoe 70a and the screw 124. Handle 98a is thereby fixed both axially and rotationally with respect to the instrument carrier, and may be used to rotate the latter whenever the clutch elements 80 and 100 are disengaged.

Clutch control means of any convenient type may be provided. As illustratively shown, a clutch control element is mounted in a transverse bore 130 in the body of handle 98a and comprises a cylindrical plunger 132. One end of plunger 132 protrudes from bore 130 and carries a thumb piece 134 by which the plunger may be pressed axially inward in the bore. A linkage mechanism of any suitable type may be provided between plunger 132 and the upper end of spindle 92a, whereby axially inward movement of the plunger in its bore produces (in the present instance) axially downward movement of spindle 92a to disengage the clutch. As illustrated that linkage mechanism comprises a cam structure. The two face cam members 140 and 142 have interengaging cam formations 141 which produce relative axial movement of the cam members in response to their relative rotation. Cam member 140 is fixedly mounted on the upper end of spindle 92a, as by the set screw 144. Cam member 142 is freely rotatable about rod 120. Its upward axial movement is limited by any suitable means, such as by bearing contact with the lower end of the handle bushing 121. The spring 104a yieldably urges the cam members together. Cam member 142 carries a radially extending arm 146 which enters bore 130, the latter being eccentric with respect to head axis 31. The end of arm 146 is fittingly received by an annular channel 147 formed in plunger 132 (see Fig. 5). With that illustrative structure, movement of plunger 132 in its bore in handle 98a causes cam member 142 to rotate relative to the handle, and hence relative to cam member 140, since the latter is rotatively fixed with respect to the handle. Cam formations 141 then produce axial movement of spindle 92a. The parts are preferably so arranged that inward pressure on thumb piece 134 produces disengagement of clutch elements 80 and 100. Upon release of that thumb pressure, spring 104 causes clutch engagement and returns plunger 132 to its normal position.

Detent means may be provided, if desired, to maintain clutch release. For example, a pin 150 may be fixedly mounted in handle 98a diametrally of bore 130. The pin is received in an L-shaped slot 151 in plunger 132, as indicated in Fig. 5. After depression of thumb piece 134 to release the clutch, a slight rotation of the plunger will then lock it in clutch-releasing position.

As may be seen clearly in Fig. 6, the preferred type of clutch structure comprises equal pluralities of interengaging tooth structures on the two clutch members. During clutch engagement, each tooth formation of one clutch element is fittingly received between two adjacent formations of the other clutch element. The two clutch elements are thus locked in a positively defined mutual rotational relation by engagement of a large number of defining faces. All of those faces are preferably slightly oblique with respect to head axis 31, providing a slight camming action which aids final indexing of the clutch members and locks them positively without backlash. It has been found particularly convenient and economical to provide locking formations of similar or even identical type on the two members to be indexed, as clearly shown in Fig. 6. However, in its broader aspects the invention embraces a wide variety of detailed clutch structures. As illustratively shown in Fig. 7, one clutch element may, for example, comprise a plurality of axially extending pins 160 uniformly spaced circumferentially of axis 31, and the other clutch element may be formed with radial slots 162 in position to receive respective pins. Pins 160 are preferably slightly tapered, as indicated, and their ends may be beveled. During engagement of locking formations of that illustrative type, as in the embodiment of Fig. 6, every formation of one clutch element is positively held between two defining faces of the other clutch element. Hence any tendency to wear is distributed uniformly over all defining surfaces of each element.

Figure 8:
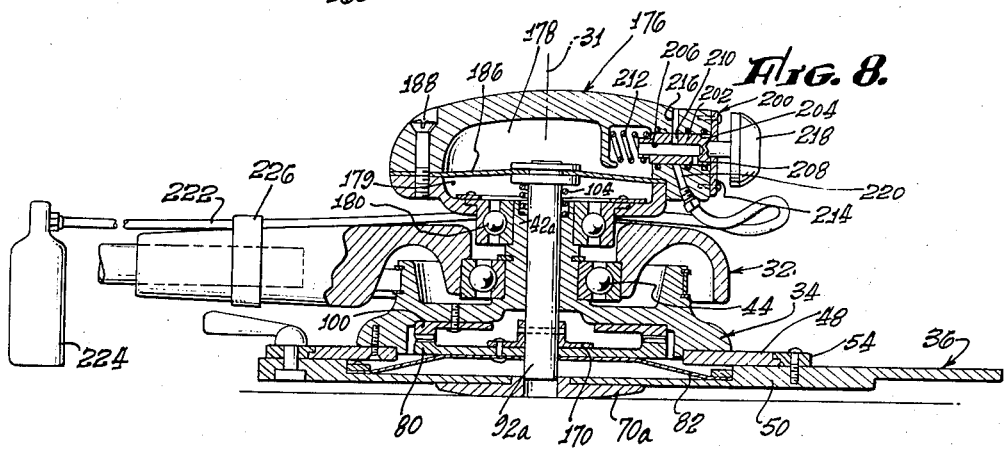
Fig. 8 is a section corresponding to Fig. 3 and representing a further modification.
Figure 9:
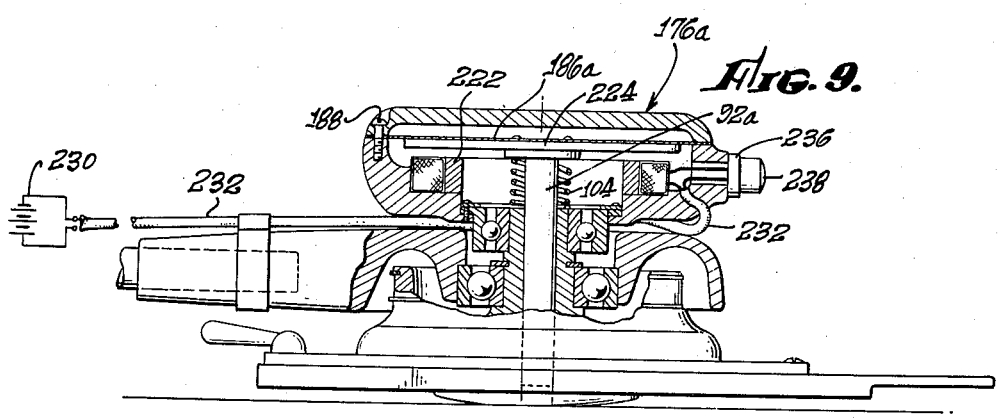
Fig. 9 is a section corresponding to Fig. 8 and representing a further modification.

A further aspect of the invention now to be described, provides power assisted control of the indexing action, as is illustratively shown in two typical embodiments in Figs. 8 and 9. Elements corresponding to those already described are usually denoted by the same numerals, a letter being added in some instances to call attention to a structural modification.

The lower portion of the mechanism shown in Fig. 8 is functionally similar to that of the first described embodiment, but is structurally modified, primarily by omission of central boss 72 on shoe 70, and omission from spindle 92 of the integral flange 96. Lower clutch member 80 and the inner periphery of flexible member 82 may be secured to spindle 92a in any convenient manner, as via the fixed hub member 170. Member 82 forms a driving connection for rotation between spindle 92a and instrument carrier 36, while permitting their relative axial movement, as already described. The lower end of spindle 92a in Fig. 8 is preferably guided in an axial bore in shoe 70a, as before. Spindle 92a is thus axially movable with lower clutch member 80 relative to reference member 34 for controlling release and engagement of the indexing clutch mechanism.

In Fig. 8, handle 176 is rotationally fixed with respect to spindle 92a, but is axially movable with respect to the spindle. As illustratively shown, the axial position of handle 176 is defined by the coaxial ball bearing 180, which journals the handle on the upwardly extending sleeve portion 42a of reference member 34. That bearing, together with reference member bearing 44, anchors the handle axially in a particularly convenient manner with respect to the main body 32 of the drafting machine head, yet permits the handle to turn with spindle 92a relative to the reference member.

Handle 176 is formed with an internal cavity of generally circular section coaxial with head axis 31. The cavity is divided by a diaphragm 186 into upper and lower portions 178 and 179, the former being entirely enclosed and the latter being preferably open to the atmosphere, as through apertures of bearing 180. The outer periphery of diaphragm 186, as illustrated, is fixedly connected in air-tight relation to the handle wall by being tightly clamped by the screws 188 between upper and lower portions of the handle body. The center of the diaphragm is fixedly mounted between clamping washers 190 on the upper end of spindle 92a. The diaphragm is of any suitable material, such as light resilient sheet metal, which is not gas-permeable, is substantially rigid in its own plane to form a rotational driving connection between handle 176 and spindle 92a, and is sufficiently flexible transversely to accommodate vertical spindle movement for clutch operation.

Means are provided for selectively admitting gas under pressure to chamber 178 to drive diaphragm 186 and spindle 92a axially downward to release the indexing clutch, and for exhausting the pressure in chamber 178 to the atmosphere to permit spindle 92a to be returned upward as by the spring 104 to engage the indexing clutch. A manually operable control valve is indicated at 200, comprising a valve plunger 202 slidable axially in a bore 204 in handle 176.

Valve plunger 202 has an axial bore 206 which communicates at its inner end with chamber 178 and is provided with radial inlet and outlet valve passages 208 and 210, respectively. Valve plunger 202 is urged yieldingly outwardly by the coil spring 212 to a normal axial position, as illustrated, which is defined by the retaining plate 214. In that valve position, valve outlet passage 210 communicates with a bore 216 in the handle body, which communicates with the atmosphere and establishes atmospheric pressure in chamber 178.

Valve plunger 202 may be moved inward manually, as by depressing the thumb piece 218. That movement closes outlet passage 210 and brings valve inlet passage 208 into communication with a bore 220 in the handle body, to which gas under pressure is supplied in any convenient manner. As indicated, a pressure supply line 222 of flexible material such as neoprene, for example, is connected at one end to bore 220 and at the other end to a bottle of compressed gas, indicated schematically at 224. Tube 222 preferably extends along the structural arms 20 and 14 of the drafting machine, on which it may be mounted by clips 226. Tube flexibility permits unimpeded movement of the drafting machine head over the drafting board. Thus gas bottle 224 may be placed at any convenient location, such as on the floor below the drafting board. Depression of thumb piece 218 causes valve 200 to admit gas under pressure to chamber 178, deflecting diaphragm 186 downward and releasing indexing clutch 80, 100. Release of thumb piece 218 exhausts the pressure from chamber 178, whereupon the clutch is reengaged by spring 104.

Fig. 9 represents an embodiment which is similar in many respects to Fig. 8, but in which power for operating the indexing means is electrical rather than pneumatic. An electrical solenoid winding is indicated at 220, fixedly mounted in the lower portion of handle 176a, which is broadly similar in structure and mounting to handle 176 of Fig. 8. Within winding 220 may be mounted an annular core 222 of a material having high magnetic permeability such as soft iron. A circular solenoid armature 224 of similar material is fixedly mounted coaxially on the upper end of spindle 92a with its periphery overlying coil 220 and core 222. A flexible member 186a is mounted like diaphragm 186 of Fig. 8 and provides a driving connection for rotary movement between spindle 92a and handle 176a, while permitting their relative axial movement.

A suitable source of electrical power, indicated schematically as the battery 230, is connected, as via the flexible cable 232, to solenoid winding 220, the electrical circuit containing in series a normally open control switch. Such a switch is represented schematically at 236, mounted directly on handle 176a and having an operating button 238 which may be depressed to close the switch. Completion of the circuit causes a current to flow in solenoid winding 220 and attracting armature 224 axially downward to release the indexing clutch. The instrument carrier may then be rotated by turning handle 176a. Release of button 238 opens the solenoid circuit, allowing spring 104 to reengage the clutch in the first indexing position that is reached.

In the embodiment of Figs. 8 and 9, the motor means for clutch actuation, which is pneumatic in one instance and electromagnetic in the other, supplies power directly for clutch actuation in one direction, shown illustratively as for clutch release, and clutch actuation in the other direction is produced by spring force. However, viewed more broadly, spring 104 may be considered part of the motor means, storing power during clutch actuation in one direction and releasing that power to produce opposite clutch actuation. Hence, the structures shown are illustrative of the wide variety of motor means that may be provided to drive clutch actuation in both directions under manual control.

I claim:

1. In a head assembly for a drafting machine, the combination of a head frame adapted for movement over the surface of a drawing board, a circular belt-driven reference member journaled on the frame on an axis perpendicular to the drawing board, the frame overlying the reference member, an instrument carrying work member journaled coaxially below the reference member and the frame in fixed axial relation thereto, upper and lower clutch elements having respective pluralities of circumferentially spaced tooth formations which are shiftable between engaged and disengaged relation by mutual axial movement of the clutch elements, means mounting the clutch elements in fixed rotational relation to the reference member and to the work member, respectively, one of the clutch elements being axially movable with respect to its associated member, a coaxial shaft journaled with respect to the reference member and having its lower end rotationally fixed with respect to the work member, and control means mounted above the frame, said control means being manually rotatable about the axis to rotate the shaft and the work member, a control element movable in one direction to cause engagement of the clutch means and movable in the other direction to cause release of the clutch means, motor means actuable to drive the control element movement and manually operable control means for supplying power to the motor means for actuation thereof.

2. Indexing mechanism as defined in claim 1 and in which said motor means comprises a flexible diaphragm and structure forming a chamber communicating with one side of the diaphragm, and the second mentioned control means comprises structure forming a passage for supplying gas under pressure to the chamber and manually operable valve means in said passage.

3. Indexing mechanism as defined in claim 1 and in which said motor means comprises armature means operatively connected to the control element and electromagnetic means energizable to cause armature movement, and the second mentioned control means comprises circuit means for energizing the electromagnetic means and including a manually operable switch.

4. The combination defined in claim 5 and in which said control means comprises a hand wheel mounted coaxially of the members for manually rotating the work member when the clutch means are disengaged, linkage means extending axially between the clutch means and the hand wheel, motor means mounted within the body of the hand wheel and operatively connected to the linkage means, said motor means being actuable to control clutch engagement, a source of power, and manually operable means mounted on the hand wheel for supplying power from the power source to actuate the motor means.

5. In a head assembly for a drafting machine, the combination of a head frame adapted for movement over the surface of a drawing board, a circular belt-driven reference member journaled on the frame on an axis perpendicular to the drawing board, the frame overlying the reference member, an instrument carrying work member journaled coaxially below the reference member and the frame in fixed axial relation thereto, upper and lower clutch elements having respective pluralities of circumferentially spaced tooth formations which are shiftable between engaged and disengaged relation by mutual axial movement of the clutch elements, means mounting the clutch elements in fixed rotational relation to the reference member and to the work member, respectively, one of the clutch elements being axially movable with respect to its associated member, a coaxial shaft journaled with respect to the reference member and having its lower end rotationally fixed with respect to the work member, and control means mounted above the frame, said control means being manually rotatable about the axis to rotate the shaft and the work member, and being manually actuable independently of said rotation to drive the axial movement of said one clutch element.

6. The combination defined in claim 5, and in which said one clutch element is fixedly mounted on the lower end of the shaft, said control means comprising a hand wheel fixedly mounted on the upper end of the shaft, the hand wheel being rotatable about the axis to drive the shaft and the work member and being movable axially with the shaft to drive the axial movement of said one clutch element.

7. The combination defined in claim 5, and in which said one clutch element is fixedly mounted on the lower end of the shaft, said control means comprising a hand wheel, means mounting the hand wheel in fixed rotational relation to the shaft and in fixed axial relation to the frame and to said members, and power means actuable to drive the shaft and said one clutch element axially with respect to the hand wheel.

8. In a head assembly for a drafting machine, the combination of a head frame adapted for movement over the surface of a drawing board, a circular belt-driven reference member journaled on the frame on an axis perpendicular to the drawing board, the frame overlying the reference member, an instrument carrying work member journaled coaxially below the reference member and the frame in fixed axial relation thereto, upper and lower clutch elements having respective pluralities of circumferentially spaced tooth formations which are shiftable between engaged and disengaged relation by mutual axial movement of the clutch elements, means mounting the clutch elements in fixed rotational relation to the reference member and to the work member, respectively, one of the clutch elements being axially movable with respect to its associated member, a shaft fixedly mounted on the work member coaxially of said axis, a hand wheel fixedly mounted on the shaft above the frame and the reference member, a control member mounted on the hand wheel for relative movement transversely of the axis, and coupling means extending coaxially of the shaft and acting to drive the axial movement of said one clutch element in response to movement of the control member.

9. The combination defined in claim 8, and in which the coupling means comprises a sleeve movable on said shaft in response to movement of the control member and means drivingly connecting the lower end of the sleeve to said one clutch element, said reference member having an axial bore in which the sleeve is guidingly received.

10. The combination defined in claim 5, and in which said control means includes a control element movable in one direction to cause engagement of the clutch means and movable in the other direction to cause release of the clutch means, resilient means yieldingly urging the control element in said one direction, motor means actuable to drive the control element in the other direction against the force of the resilient means, and manually operable means for actuating the motor means.

11. In a head assembly for a drafting machine, the combination of a head frame adapted for movement over the surface of a drawing board, a circular belt-driven reference member journaled on the frame on an axis perpendicular to the drawing board, the frame overlying the reference member and having a depending flange which spacedly encloses the periphery thereof, an instrument carrying work member journaled coaxially below the reference member and the frame in fixed axial relation thereto, a foot formation carried by the work member and adapted to engage the drawing board substantially at the axis and thereby to support the head assembly, the axially opposing faces of the reference member and the work member forming a fully enclosed, generally cylindrical chamber surrounding the axis, upper and lower clutch elements having respective pluralities of the circumferentially spaced tooth formations which are shiftable between engaged and disengaged relation by mutual axial movement of the clutch elements, means mounting the clutch elements within the chamber in fixed rotational relation to the reference member and to the work member, respectively, one of the clutch elements being axially movable with respect to its associated member, a coaxial shaft journaled with respect to the reference member and having its lower end rotationally fixed with respect to the work member, and control means mounted above the frame, said control means being manually rotatable about the axis to rotate the shaft and the work member, and being manually actuable independently of said rotation to drive the axial movement of said one clutch element.

References Cited in the file of this patent

UNITED STATES PATENTS 1,690,568    Bullard _____ Nov. 6, 1928

FOREIGN PATENTS 1,004,723    France _____ Nov. 28, 1951